United States Patent [19]

Takahara

[11] Patent Number: 4,902,996
[45] Date of Patent: Feb. 20, 1990

[54] MOVABLE COIL DRIVING UNIT
[75] Inventor: Kenichi Takahara, Tokyo, Japan
[73] Assignee: Kabushiki Kaisha Toshiba, Kawasaki, Japan
[21] Appl. No.: 138,451
[22] Filed: Dec. 28, 1987
[30] Foreign Application Priority Data Dec. 27, 1986 [JP] Japan .................. 61-311885

[51] Int. Cl.$^4$ ............................................. H01F 7/08
[52] U.S. Cl. ..................................... 335/222; 335/223; 381/194; 381/199
[58] Field of Search ............... 335/222, 231, 230, 223; 381/192-194, 199-201

[56] References Cited

U.S. PATENT DOCUMENTS

| 2,263,819 | 11/1941 | Ray | 335/222 |
| 3,484,730 | 12/1969 | McCormick | 335/222 |
| 3,591,815 | 7/1971 | Grootenhuis | 310/27 |
| 3,676,758 | 7/1972 | Mathews | 318/128 |
| 3,898,598 | 8/1975 | Asahi | 335/231 |
| 3,952,217 | 4/1976 | Rawlings | 335/230 X |
| 4,351,596 | 9/1982 | Ohniwa et al. | 335/222 X |

FOREIGN PATENT DOCUMENTS

| 1929703 | 2/1970 | Fed. Rep. of Germany . | |
| 2137795 | 12/1972 | France . | |
| 2224920 | 10/1974 | France . | |
| 59-221839 | 12/1984 | Japan . | |
| 321173 | 4/1957 | Sweden | 335/222 |
| 599706 | 5/1978 | Switzerland . | |
| 1367995 | 2/1974 | United Kingdom . | |

OTHER PUBLICATIONS

Hans Heimerdinger, "An Antenna Pointing Mechanism (APM) For Large Reflector Antennas", NASA CP 2181, p. 253, 1981.
Bernard Hubert et al, "Sofa, An Antenna Fine Pointing Mechanism", NASA C-2181, p. 235, 1981.

Primary Examiner—George Harris
Attorney, Agent, or Firm—Foley & Lardner, Schwartz, Jeffery, Schwaab, Mack, Blumenthal & Evans

[57] ABSTRACT

A movable coil driving unit comprises a driven member movably supported by conductive flexible supporting members with respect to a fixed member, a coil fixed to the driven member, and a driving member provided with a power source. One ends of the supporting members are connected to the ends of leads extending from the coil fixed to the driven member, and the other ends of the supporting members are connected to leads extending from the external power source.

10 Claims, 5 Drawing Sheets

MOVABLE COIL DRIVING UNIT

BACKGROUND OF THE INVENTION

1. Field of the Invention

The present invention relates to a movable coil driving unit, and particularly to a movable coil driving unit having a moving coil with improved driving responsibility and reduced power consumption.

2. Description of the Prior Art

Movable coil driving units are widely used for speakers, mechanisms for driving the heads of magnetic disk units, etc. Recently, they are also used for linear motors. The linear motor is based on the Fleming's left-hand rule to use force generated when electrical current is applied to a coil positioned in a magnetic field. If a permanent magnet which is a supplying source of magnetic flux is fixed, the coil is moved by applying currents to the coil, while, if the coil is fixed, the permanent magnet is moved. The former case constitutes a movable coil driving unit, and the latter a magnet driving unit.

The magnet driving unit is not applicable for a mechanism which needs a high-speed response, because the weight of the permanent magnet is too heavy to be a driven member with a high-speed response. On the other hand, the movable coil driving unit is widely applicable for devices such as speakers and mechanisms for driving the heads of magnetic disk units which require the high-speed responsibility, because a coil and a non-magnetic coil bobbin of the movable coil driving unit are sufficiently light as moving members to realize the high-speed response.

According to a conventional movable coil driving unit, a moving coil of the driving unit is connected to a power source fixed to an external fixed member from which the coil receives current through coil leads extending from the ends of the coil in a manner that the coil is suspended by the coil leads.

In such a conventional movable coil driving unit, the coil leads for suspending the coil will cause resistance against the movement of the coil as well as bothering the range of coil movement. To reduce the resistance against the coil movement, the diameter of the coil leads shall be reduced. However, if the diameter is reduced, an electrical resistance value of the coil leads is increased so that power consumption also is increased. Further, if the number of windings and the length of the coil are increased to raise the driving force of the coil, an electrical resistance value of the coil is increased to increase power consumption also.

In addition, if the diameter of the coil leads is enlarged to reduce the power consumption, mechanical resistance of the coil leads is increased to deteriorate a response in driving the coil. Therefore, there is a requirement to provide a movable coil driving unit which has a good response in driving a coil while realizing low power consumption.

SUMMARY OF THE INVENTION

An object of the present invention is to provide a movable coil driving unit in which the diameter of coil leads can be increased with an improved response in coil movement.

In order to accomplish the object, the present invention provides a movable coil driving unit comprising flexible supporting members made of conductive material, a driven member movably supported by the flexible supporting members with respect to a fixed member, and a coil fixed to the driven member. The ends of the flexible supporting members are connected to the ends of coil leads of the coil fixed to the driven member, while the other ends of the flexible supporting members are connected to an external power source.

According to the movable coil driving unit of the present invention, the coil of the driven member is connected to the one ends of the flexible supporting members with coil leads, and leads from the external power source are connected to the other ends of the flexible supporting members. Therefore, the flexible supporting members are deformed between both the ends thereof so that the coil leads between the one ends of the flexible supporting members and the coil move together with the coil to cause no resistance against the coil movement.

As a result, the diameter of the coil leads can be enlarged to improve the responsibility of the coil and reduce power consumption.

BRIEF DESCRIPTION OF THE DRAWINGS

These and other objects, features and advantages of the present invention will become apparent from the following description of preferred embodiments taken in conjunction with the accompanying drawings in which.

DETAILED DESCRIPTION OF THE PREFERRED EMBODIMENTS

Figure 1:
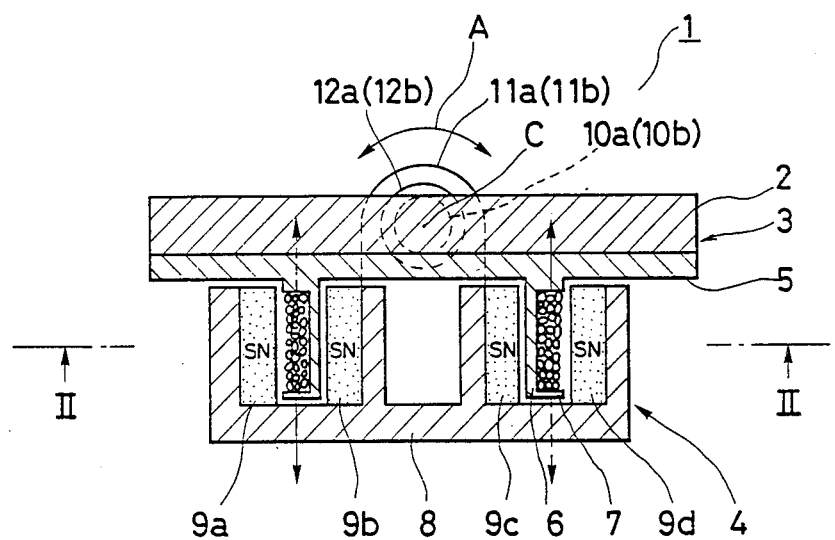
FIG. 1 is a cross-sectional view showing a movable coil driving unit according to a first embodiment of the present invention.
Figure 2:
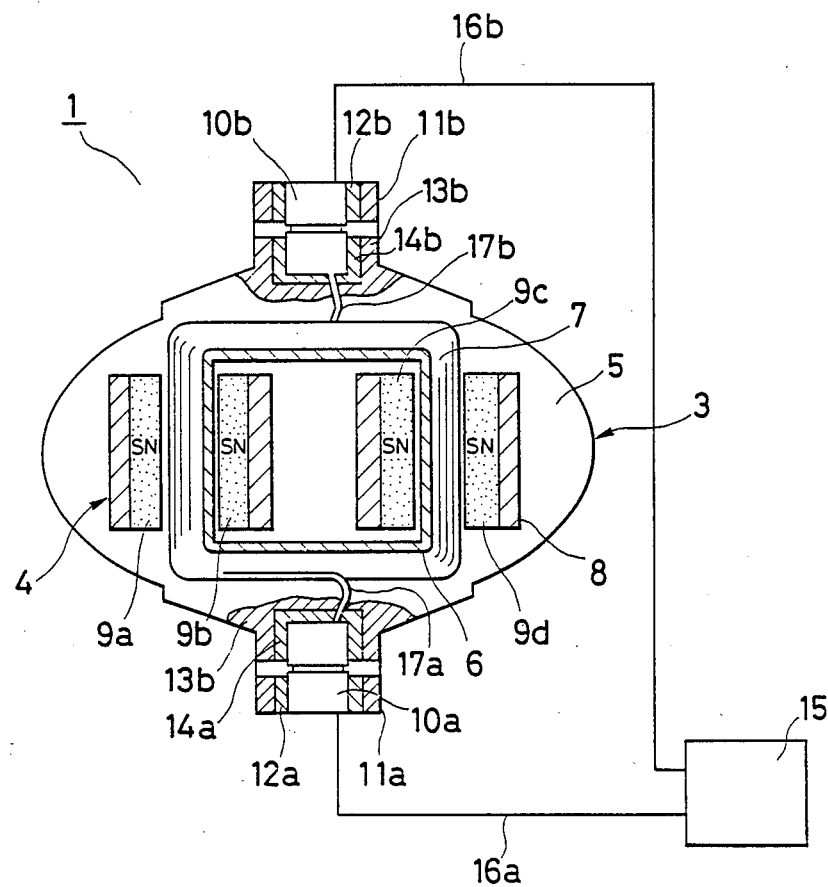
FIG. 2 is a cross-sectional view taken along a line II—II shown in FIG. 1.

FIGS. 1 and 2 are views showing a movable coil driving unit adopted for a mirror driving mechanism, according to the first embodiment of the present invention. The mirror driving mechanism 1 has a mirror 2 which is rotated for a minute angle around a driving center axis "C". This mechanism is used as a pointing mechanism of an optical system.

The mirror driving mechanism 1 comprises a driven member 3 with the mirror 2, and a driving member 4 for driving the driven member 3.

The driven member 3 comprises, the mirror 2, a mirror supporting plate 5 for supporting the mirror 2, a coil bobbin 6 integral with the mirror supporting plate 5, and a coil 7 wound around the coil bobbin 6. The driving member 4 comprises a base 8 and four permanent magnets 9a, 9b, 9c fixed to the base 8.

At upper parts on both sides of the driving member 4, there are fixed flexible pivots 10a and 10b which support both sides of the mirror supporting plate 5 of the driven member 3 such that the driven member 3 is rotatable around the center axis C.

A structure for supporting the flexible pivots 10a and 10b will be described in detail. The base 8 has supporting portions 11a and 11b arranged at upper parts on both sides of the base 8. The flexible pivots 10a and 10b are fixed to the supporting portions 11a and 11b through insulating members 12a and 12b, respectively. Inner rotating portions of the flexible pivots 10a and 10b are fixed through insulating members 14a and 14b to projections 13a and 13b disposed on both sides of the mirror supporting plate 5.

The inner rotating portions and outer portions of the flexible pivots 10a and 10b rotate relative to each other and are electrically conductive to each other.

Electric connection for applying currents to the coil 7 of the driven member 3 will be described. An external driving device 15 for supplying driving currents is electrically connected to the outer portions of the flexible pivots 10a and 10b with electric wires 16a and 16b. The inner rotating portions of the flexible pivots 10a and 10b are connected to the coil 7 with coil leads 17a and 17b.

The operation of the mirror driving mechanism 1 adopting the movable coil driving unit of the present invention will be explained.

The driving device 15 applies current to the flexible pivots 10a and 10b through the electric wires 16a and 16b, respectively. The currents flow through the conductive flexible pivots 10a and 10b, the coil leads 17a and 17b and the coil 7. The currents flowing through the coil 7 generate driving force according to the Fleming's left-hand rule. The driving force acts on the coil 7 in the direction of an arrow "A" shown in FIG. 1 to minutely rotate the mirror supporting plate 5 and the mirror 2 around the flexible pivots 10a and 10b.

An inclining angle of the mirror 2 can be controlled by changing the amplitude of the current supplied from the driving device 15 to the coil 7, and the direction of the inclination is determined by the direction of the current.

In this way, the driven member 3 is rotated with respect to the driving member 4, while the coil leads 17a and 17b for connecting the coil 7 to the inner rotating portions of the flexible pivots 10a and 10b follow the rotational movement of the coil 7. Therefore, the coil leads 17a and 17b will never cause mechanical resistance against the movement of the coil 7. Relative positions of the coil 7, the coil leads 17a and 17b, and the flexible pivots 10a and 10b will never be changed by the movement of the coil 7. Accordingly, the coil leads 17a and 17b are not subjected to local bending force and fatigue.

If there is no mechanical resistance against the movement of the driven member 3, the diameter of a conductor of the coil 7 can be increased to reduce an electrical resistance value thereof to reduce power consumption with constant driving force, or to increase the driving force with constant power consumption. Thus, there is realized a movable coil driving unit having a high frequency responsibility and consuming less power.

Figure 3:
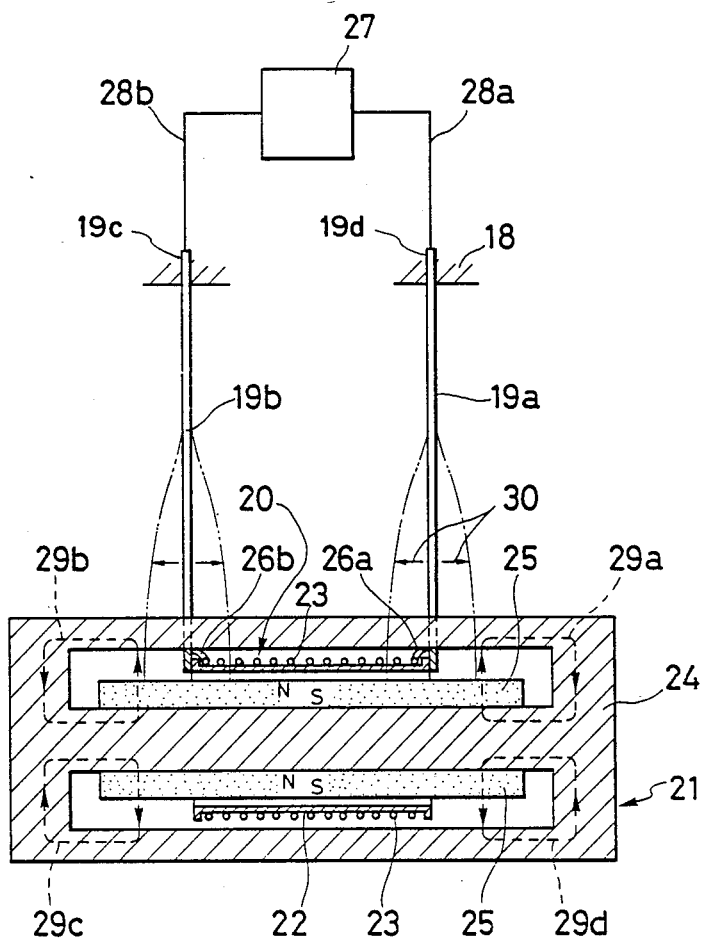
FIG. 3 is a cross-sectional view showing a movable coil driving unit according to a second embodiment of the present invention.

FIG. 3 is a view showing the second embodiment of the present invention. In the figure, a fixed member 18 is provided with flexible conductive springs 19a and 19b which support a driven member 20. The driven member 20 is movable with respect to a driving member 21.

The driven member 20 comprises a coil bobbin 22 both ends thereof being supported by the springs 19a and 19b, and a coil 23 wound around the coil bobbin 22. The driving member 21 comprises a yoke 24 and a permanent magnet 25.

To apply currents to the coil 23, coil leads 26a and 26b of the coil 23 are connected to the flexible springs 19a and 19b respectively. Fixing portions 19c and 19d of the springs 19a and 19b are fixed to the fixed member 18 and connected to electric wires 28a and 28b which are connected to a power source 27. Accordingly, currents from the power source 27 flow through the springs 19a and 19b and the coil 23.

According to the movable coil driving unit of the above-mentioned arrangement, the permanent magnet 25 generates magnetic flux as indicated by arrow marks 29a, 29b, 29c and 29d shown in FIG. 3, the magnetic flux circulating in a space where the coil 23 is located. When currents are supplied from the power source 27 through the electric wires 28a and 28b, the springs 19a and 19b and the coil leads 26a and 26b to the coil 23, the coil 23 deflects the springs 19a and 19b as indicated by arrow marks 30, and moves linearly within the yoke 24.

According to the movable coil driving unit of the second embodiment, the movement of the driven member 20 causes the same movement onto the lower ends of the springs 19a and 19b and the coil 23 so that the coil leads 26a and 26b connecting the springs to the coil may be stationary not to limit the movable range of the coil 23 and not to cause mechanical resistance against the movement of the coil 23. Therefore, in this embodiment, the diameter of a conductor of the coil can be increased to increase driving force without hindering the movement of the driven member 20, thereby realizing a driving unit having a high-speed responsibility and less power consumption.

Figure 4:
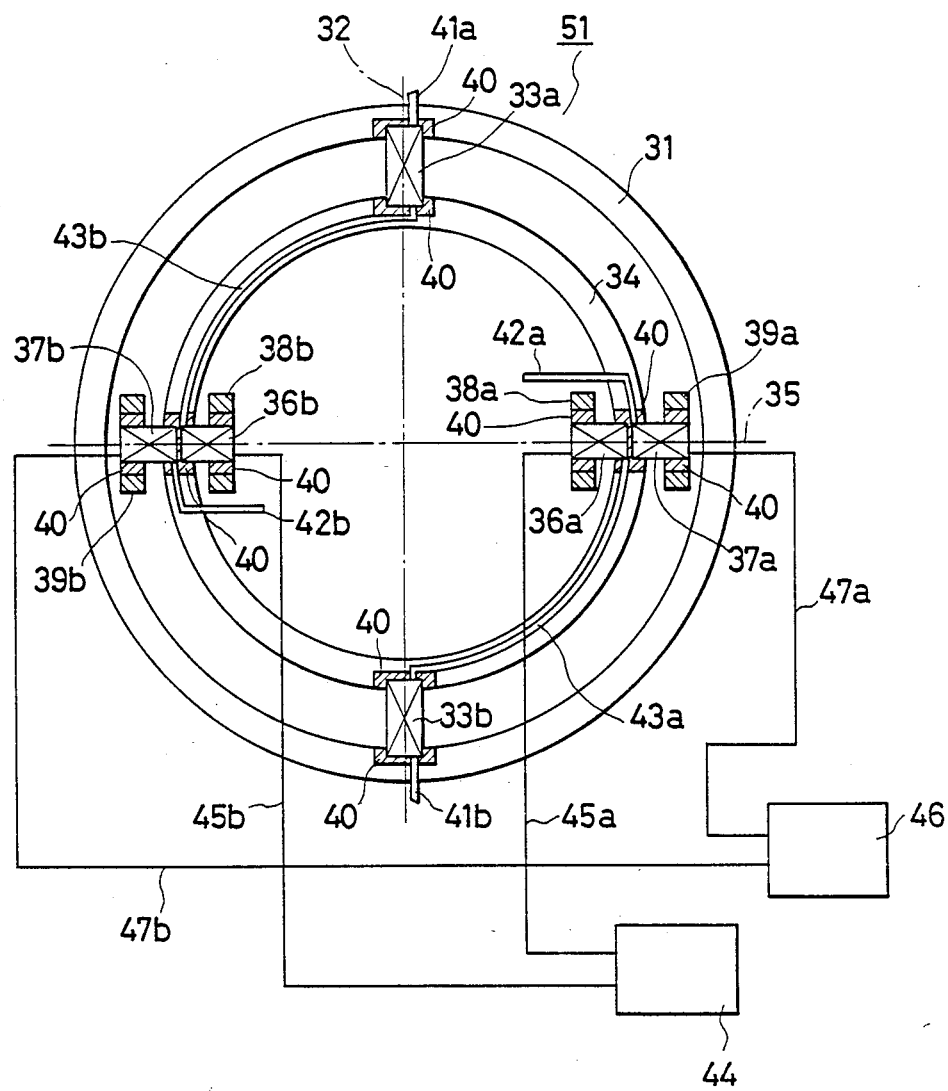
FIG. 4 is a cross-sectional view showing a movable coil driving unit according to a third embodiment of the present invention.
Figure 5:
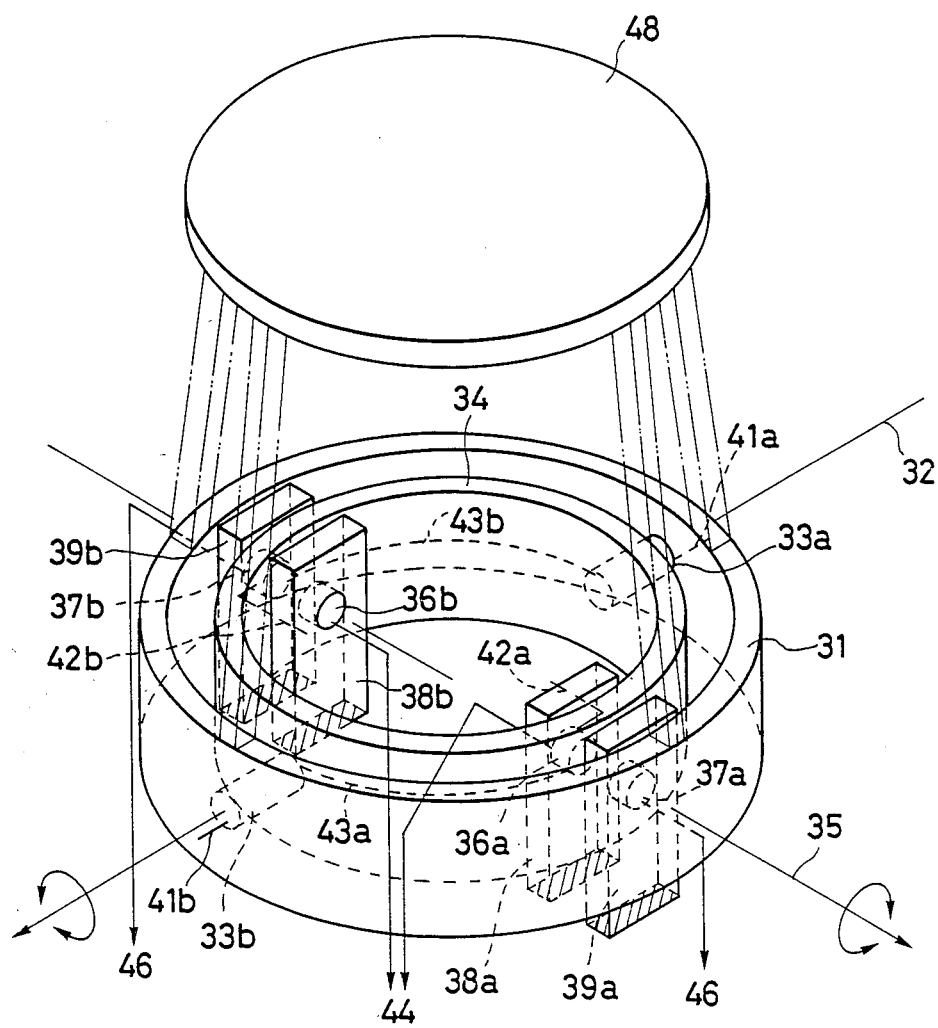
FIG. 5 is a perspective view showing the third embodiment shown in FIG. 4.

FIGS. 4 and 5 are views showing a movable coil driving unit applied for a double-shaft gimbal mechanism, according to the fourth embodiment of the present invention. The double-shaft gimbal mechanism comprises an outer ring 31 fixed to a driven member 48 such as an antenna and a mirror; a pair of outer flexible pivots 33a and 33b for supporting the outer ring 31 around a rotation axis 32; an inner ring 34 fixed to inner ends of the outer flexible pivots 33a and 33b; two pairs of inner flexible pivots (36a, 36b) and (37a, 37b) for supporting the inner ring 34 around a rotation axis 35; and two pairs of supporting members (38a, 38b) and (39a, 39b) for supporting the two pairs of inner flexible pivots and disposed on a base (not shown) which supports permanent magnets acting as driving members.

On the peripheries of the outer flexible pivots 33a and 33b and of the two pairs of inner flexible pivots (36a, 36b) and (37a, 37b), there are disposed insulating materials 40. The insulating materials 40 will not be required if the outer ring 31 and the inner ring 34 are made of insulating material.

Two coils are wound around the outer ring 31 and the inner ring 34, respectively. The coil around the outer ring 31 is connected to the outer flexible pivots 33a and 33b with coil leads 41a and 41b respectively. The coil around the inner ring 34 is connected to the inner flexible pivots 37a and 37b with coil leads 42a and 42b respectively. Further, the outer flexible pivots 33a and 33b are connected to the inner flexible pivots 36a and 36b with leads 43a and 43b respectively.

To drive the outer ring 31, there is disposed an outer ring driving controller 44 which is connected to the inner flexible pivots 36a and 36b with electric wires 45a and 45b respectively to form a current path passing through the outer ring driving controller 44, electric wires 45a and 45b, the inner flexible pivots 36a and 36b, leads 43a and 43b, outer flexible pivots 33a and 33b, coil leads 41a and 41b, and the outer ring coil (not shown).

To drive the inner ring 34, there is disposed an inner ring driving controller 46 which is connected to the inner pivots 37a and 37b with electric wires 47a and 47b to form a current path passing through the inner ring driving controller 46, the electric wires 47a and 47b, the inner flexible pivots 37a and 37b, the coil leads 42a and 42b, and the inner ring coil (not shown).

The operation of the movable coil driving unit for the double-shaft gimbal of the arrangement mentioned in the above will be described. The inner ring 34 is supported by the inner flexible pivots (36a, 36b) and (37a, 37b) with respect to the supporting members (38a, 38b) and (39a, 39b) of the fixed member (not shown), and rotates freely around the rotation axis 35.

When currents are supplied from the inner ring driving controller 46 through the electric wires 47a and 47b to the coil (not shown) of the inner ring 34, the inner ring 34 is rotated around the rotation axis 35 for an angle corresponding to the amount of the supplied currents. The inclining direction of the angle can be adjusted by changing the direction of currents from the inner ring driving controller 46.

The outer ring 31 is supported by the outer flexible pivots 33a and 33b fixed to the inner ring 34, and rotates freely around the rotation axis 32.

When currents are supplied from the outer ring driving controller 44 through the electric wires 45a and 45b to the coil (not shown) of the outer ring 31, the outer ring 31 is rotated around the rotation axis 32 for an angle corresponding to the amount of the supplied currents. The inclining direction of the angle can be adjusted by changing the direction of currents from the outer ring driving controller 44.

If the outer ring 31 is fixed to a driven member such as an antenna and a mirror (not shown), the driven member can be inclined in a required direction by controlling the direction and amplitude of currents supplied from the outer and inner ring driving controllers 44 and 46 to control the rotation of the outer and inner rings 31 and 34 around the rotational axes 32 and 35.

According to the movable coil driving unit for the double-shaft gimbal mechanism, the coils (not shown) wound around the outer and inner rings 31 and 34 are connected by the flexible pivots 33a, 33b, (36a, 36b) and (37a, 37b), coil leads 41a, 41b, 42a and 42b, and leads 43a and 43b so that the coil leads and leads move together with the outer and inner rings 31 and 34 but never move independently. Therefore, driving force will not be lowered, and the diameters of the coils can be increased to realize high-speed responsibility and reduce power consumption.

The present invention is not limited by the above-mentioned embodiments. For instance, it is possible to use conductive bearings as the supporting means. Therefore, various modifications will be possible for the present invention within the scope of the present invention.

In summary, according to the movable coil driving unit of the present invention, a coil of a driven member is connected to supporting means with coil leads, and an external power source is connected to the supporting means so that the coil leads connecting the coil of the driven member to the supporting means will never move independently to cause resistance against the movement of the driven member. Therefore, while maintaining high-speed responsibility which is a feature of the movable coil driving unit, the diameter of the coil can be increased to reduce power consumption.

Various modifications will become possible for those skilled in the art after receiving the teachings of the present disclosure without departing from the scope thereof.

What is claimed is:

1. A movable coil driving unit comprising:
   a movable coil;
   a supporting structure, including a pivot joint, for supporting said coil thereon;
   a magnetic field inducing means for subjecting said coil to an magnetic field; and
   an electric energy supply for supplying electric current to said coil in order to move said coil by virtue of a magnetic force generated by said magnetic field,
   wherein the current supply is provided directly through said pivot joint which comprises a rotatable member and a fixed member, the fixed member being engaged with said rotatable member in a manner that electric current can pass from one member to the other.

2. A movable coil driving unit comprising:
   a movable coil;
   a supporting structure, including a pivot joint, for rotatably supporting said coil thereon, said pivot joint having a first member and a second member, rotatably and electrically engaged with each other;
   a magnetic field inducing means for subjecting said coil to a magnetic field; and
   an electric energy supply for supplying electric current to said coil directly through said pivot joint in order to move said member by a magnetic force generated in said magnetic field.

3. The movable coil driving unit as claimed in claim 1, wherein said supporting member movably supports said moving coil, one end of said supporting member being attached to said moving coil and the other end thereof being attached to said fixed member.

4. The movable coil driving unit as claimed in claim 3, wherein the one end of said supporting member is electrically connected to said moving coil while the said other end thereof is electrically connected to the external power source.

5. The movable coil driving unit as claimed in claim 4, wherein said supporting member includes pivots for rotatably supporting said moving coil, one end of each pivot being electrically connected to one lead of said movable coil, the other end of each pivot being electrically connected to one lead from the external power source.

6. The movable coil driving unit as claimed in claim 4, wherein said supporting member comprises springs for supporting said moving coil with respect to said fixed member, such that said moving coil is movable linearly, one end of each flexible spring being electrically connected to one moving coil lead, respectively, while the other end of said spring is electrically connected to one lead of the external power source, respectively.

7. The movable coil driving unit as claimed in claim 5, wherein each pivot includes an inner rotating portion fixed to said moving coil and an outer portion fixed to said fixed member, the inner rotating portion and the outer portion being rotatable and electrically conductive relative to each other.

8. A movable coil driving unit, comprising:
   a magnetic coil;
   a support for rotatably supporting the coil,
   a magnetic field inducing means for subjecting the coil to a magnetic field;

electrical energy supply means; and electrical connections between the support means and the coil for energizing the coil and causing the coil and the support to rotate in synchronism, whereby the electrical connections do not move relative to the synchronized movement of the support and the coil.

9. The movable coil driving unit of claim 8, in which the electrical energy supply means is connected to a fixed outer member and the electrical connections are connected to the support, the support and outer member being in electrical contact with each other.

10. The rotatable coil driving unit of claim 14, in which the electrical energy supply means may be adjusted to supply current of selected amplitude and polarity, thereby controlling the distance and direction of movement of the coil.

* * * * *